United States Patent
Riggs et al.

(10) Patent No.: US 10,204,151 B2
(45) Date of Patent: *Feb. 12, 2019

(54) SYNTACTIC TAGGING IN A DOMAIN-SPECIFIC CONTEXT

(71) Applicants: Rory Riggs, New York, NY (US); Peter Beetham, San Diego, CA (US); Greg Gocal, San Diego, CA (US)

(72) Inventors: Rory Riggs, New York, NY (US); Peter Beetham, San Diego, CA (US); Greg Gocal, San Diego, CA (US)

(73) Assignee: Locus LP, Hamilton (BM)

( * ) Notice: Subject to any disclaimer, the term of this patent is extended or adjusted under 35 U.S.C. 154(b) by 331 days.

This patent is subject to a terminal disclaimer.

(21) Appl. No.: 14/736,262

(22) Filed: Jun. 10, 2015

(65) Prior Publication Data

US 2015/0310089 A1   Oct. 29, 2015
US 2017/0169093 A9   Jun. 15, 2017

Related U.S. Application Data

(63) Continuation of application No. 14/216,390, filed on Mar. 17, 2014, now Pat. No. 9,069,802.
(Continued)

(51) Int. Cl.
*G06F 17/30* (2006.01)
*G06Q 40/06* (2012.01)

(52) U.S. Cl.
CPC ........ *G06F 17/30598* (2013.01); *G06F 17/30* (2013.01); *G06F 17/30241* (2013.01); *G06F 17/30289* (2013.01); *G06F 17/30342* (2013.01); *G06F 17/30368* (2013.01); *G06F 17/30371* (2013.01); *G06F 17/30377* (2013.01);
(Continued)

(58) Field of Classification Search
CPC ......... G06F 17/30528; G06F 17/30604; G06F 17/30342; G06F 17/30554; G06F 17/30592; G06F 17/30598; G06F 17/30601; G06F 17/30958
See application file for complete search history.

(56) References Cited

U.S. PATENT DOCUMENTS 6,868,525 B1   3/2005 Szabo
6,910,044 B2   6/2005 Weinberg et al.
(Continued)

FOREIGN PATENT DOCUMENTS

WO   02/052443 A1   7/2002

OTHER PUBLICATIONS

Yong Zhang, et al., "Role-Based Database Designing for Managing Complex Objects and Their Relationships on the Web", IEEE (2000), pp. 212-219.*
(Continued)

*Primary Examiner* — Scott A. Waldron

(57) ABSTRACT

This application relates generally to defining a domain-specific syntax characterizing a functional information system and performing operations on data entities represented by the domain-specific syntax, including defining a domain-specific syntax, receiving and storing a domain-specific data entity, assigning a syntactic tag to the domain-specific data entity, and electronically storing the tag assigned to the data entity in the electronic data store so that the tag is logically linked to the stored data entity.

22 Claims, 7 Drawing Sheets

Rounded boxes represent rules.
Square boxes represent literals.

Related U.S. Application Data

(60) Provisional application No. 61/801,959, filed on Mar. 15, 2013, provisional application No. 61/802,245, filed on Mar. 15, 2013.

(52) U.S. Cl.
CPC .. *G06F 17/30424* (2013.01); *G06F 17/30528* (2013.01); *G06F 17/30554* (2013.01); *G06F 17/30589* (2013.01); *G06F 17/30592* (2013.01); *G06F 17/30601* (2013.01); *G06F 17/30867* (2013.01); *G06F 17/30879* (2013.01); *G06F 17/30958* (2013.01); *G06Q 40/06* (2013.01)

(56) References Cited

U.S. PATENT DOCUMENTS

| | | |
|---|---|---|
| 7,003,522 B1 | 2/2006 | Reynar et al. |
| 7,117,175 B2 | 10/2006 | Arnott |
| 7,587,352 B2 | 9/2009 | Arnott |
| 7,620,577 B2 | 11/2009 | Arnott et al. |
| 7,685,069 B1 | 3/2010 | Subramanian et al. |
| 7,685,083 B2 | 3/2010 | Fairweather |
| 7,747,502 B2 | 6/2010 | Arnott et al. |
| 7,769,653 B2 | 8/2010 | Rousseau et al. |
| 7,769,663 B1 | 8/2010 | Subramanian et al. |
| 7,778,905 B2 | 8/2010 | Arnott |
| 7,792,719 B2 | 9/2010 | Arnott |
| 7,870,052 B1 | 1/2011 | Goldberg et al. |
| 7,890,408 B2 | 2/2011 | Menchero et al. |
| 7,970,684 B1 | 6/2011 | Benda |
| 8,005,740 B2 | 8/2011 | Arnott et al. |
| 8,131,620 B1 | 3/2012 | Steinberg et al. |
| 8,156,154 B2 | 4/2012 | Taranov et al. |
| 8,306,892 B1 | 11/2012 | Gross et al. |
| 8,374,937 B2 | 2/2013 | Arnott et al. |
| 8,374,951 B2 | 2/2013 | Arnott et al. |
| RE44,098 E | 3/2013 | Arnott et al. |
| 8,412,609 B2 | 4/2013 | Lockwood et al. |
| 8,473,911 B1 | 6/2013 | Baxter |
| RE44,362 E | 7/2013 | Arnott et al. |
| 8,533,081 B2 | 9/2013 | Hsu et al. |
| 8,560,414 B2 | 10/2013 | Arnott |
| 8,645,317 B1 | 2/2014 | Klimetschek et al. |
| 8,694,402 B2 | 4/2014 | Arnott et al. |
| 8,805,735 B1 | 8/2014 | Goldberg et al. |
| 9,594,745 B2 * | 3/2017 | Jackson ............. G06F 17/28 |
| 2002/0198885 A1 | 12/2002 | Streepy, Jr. |
| 2005/0166140 A1 | 7/2005 | Cai et al. |
| 2005/0171884 A1 | 8/2005 | Arnott |
| 2005/0197944 A1 | 9/2005 | Arnott |
| 2006/0149645 A1 | 7/2006 | Wood |
| 2007/0061266 A1 | 3/2007 | Moore et al. |
| 2007/0162412 A1 | 7/2007 | Percy |
| 2008/0301096 A1 | 12/2008 | Kogan et al. |
| 2010/0169758 A1 | 7/2010 | Thomsen |
| 2010/0274733 A1 | 10/2010 | Engel et al. |
| 2012/0011118 A1 | 1/2012 | Gleicher et al. |
| 2012/0166358 A1 | 6/2012 | Steinberg et al. |
| 2012/0246094 A1 | 9/2012 | Hsu et al. |
| 2012/0317136 A1 | 12/2012 | Papish et al. |
| 2012/0327948 A1 | 12/2012 | Mohandoss et al. |
| 2013/0013608 A1 | 1/2013 | Bird et al. |
| 2014/0046872 A1 | 2/2014 | Arnott et al. |

OTHER PUBLICATIONS

International Search Report and Written Opinion in PCT Application PCT/US15/12762.

Aida Slavic, "Faceted Classification: Management and Use", Jan. 16, 2008.

Vanda Broughton, "A Faceted Classification as the Basis of a Faceted Terminology: Conversion of a Classified Structure to Thesaurus Format in the Bliss Bibliographic Classification, 2nd Edition", Axiomathes (2008), vol. 18, pp. 193-210.

International Search Report and Written Opinion in PCT Application PCT/US14/30825.

Fundamental Indexation, Robert D. Arnott, Jason Hsu, and Philip Moore, Financial Analysts Journal vol. 61, No. 2, 2005.

International Search Report and Written Opinion in PCT Application PCT/US14/30728.

Portfolio Selection, Harry Markowitz, The Journal of Finance, vol. 7, No. 1. (Mar. 1952), pp. 77-91.

A Simplified Model for Portfolio Analysis, William F. Sharpe, Management Science, vol. 9, No. 2 (Jan. 1963), pp. 277-293.

Measuring Predictability: Theory and Macroeconomic Applications, Francis X. Diebold, Lutz Kilian, Journal of Applied Econometrics, 16, 657-669 (2001).

Foundations of Portfolio Theory, Harry M. Markowitz, Nobel Lecture, Dec. 7, 1990.

A Five-Factor Asset Pricing Model, Eugene F. Fama and Kenneth R. French, Sep. 2014.

On Persistence in Mutual Fund Performance, Mark M. Carhart, Journal of Finance, vol. 52, Issue 1 (Mar. 1997), 57-82.

Federal Reserve Bank of New York Staff Reports, "Financial Intermediation, Asset Prices, and Macroeconomic Dynamics," Tobias Adrian, Emanuel Moench, Hyun Song Shin, Staff Report No. 422, Jan. 2010, Revised Sep. 2010.

Illiquidity Premia in Asset Returns: An Empirical Analysis of Hedge Funds, Mutual Funds, and U.S. Equity Portfolios, Amir Khandani, Andrew W. Lo, Jun. 25, 2009.

\* cited by examiner

This Biological Domain Specific Syntax Organizes Biological Data Entities According to Levels & Positions on a Level ▲ This Domain is complete; its syntax defines levels & sub-divisions; each position is valid.
  – The tag values represent valid positions in the domain syntax organized according to a domain specific tag syntax.
  – There is a valid position for every data entity of the domain.

| Example of a Biological Data Entity Tag: 1.B.II.ii | |
|---|---|
| Type of Organ System | 1/2/3/4/5/6/7/8/9/10/11/12/13 |
| Type of Tissue | A/B/C/D |
| Type of Cell | I/II/III |
| Position in Cell Cycle | i/ii/iii/iv |

FIG.1

This Jobs Domain Specific Syntax Organizes Jobs Data Entities According to Job, Department & Company Type ▲ This Domain is complete; its syntax defines levels & sub-divisions; each position is valid.

– The tag values represent valid positions in the domain syntax organized according to a domain specific tag syntax.

– There is a valid position for every data entity of the domain.

| Example of a Jobs Data Entity Tag: 2.B.VI |
|---|
| Type of Company | 1/2/3/4/5/6/7/8/9/10/11/12 |
| Type of Department | A/B/C/D/F/G/H/I/K/L/M/N |
| Type of Job | I/II/III/IV/V/VI/VII/VIII/IX/X/XI/XII |

FIG.2

This Machine Domain Specific Syntax Organizes Machine Data
Entities According to Levels & Positions on a Level ▲ This Domain is complete; its syntax defines levels & sub-divisions; each position is valid.
 − The tag values represent valid positions in the domain syntax organized according to a domain specific tag syntax.
 − There is a valid position for every data entity of the domain.

| Example of a Machine Data Entity Tag: 1.B.II.ii | |
|---|---|
| Type of Machine | 1/2/3/4/5/6/7/8/9/10/11/12 |
| Type of Functional Sub-System | A/B/C |
| Type of Functional Part | I/II/III |
| Position in Functional Material | i/ii/iii/iv |

FIG.3

This Enterprise Domain Specific Syntax Maps Enterprise Data
Entities According to Levels & Positions on a Level ▲ This Domain is complete; its syntax defines levels & sub-divisions; each position is valid.
  – The tag values represent valid positions in the domain syntax organized according to a domain specific tag syntax.
  – There is a valid position for every data entity of the domain.

| Example of an Enterprise Data Entity Tag: 1.B.II.ii | |
|---|---|
| Type of Enterprise | 1/2/3/4/5/6/7/8/9/10/11/12 |
| Type of Department | A/B/C/D/F/G/H/I/K/L/M/N |
| Type of Department Work Group | I/II/III/IV/V/VI/VII/VII/IX/X/XI/XII |
| Type of Job | i/ii/iii/iv/v/vi/vii/viii/ix/x/xi/xii |

FIG.4

```
<bar-code> ::===
    <ent-bar-code> "::"
    <int-bar-code> "::"
    <first-int-bar-code> "::"
    <second-int-bar-code> "::"
    <para-cust-bar-code> "::"
    <cust-bar-code> "::"
    <cust-wg-bar-code> "::"
    <cust-dept-bar-code> "::"
    <cust-final-bar-code> "::"
    <cust-sub-bar-code> "::"
    <c-of-c-bar-code> "::"
    <c-of-c-wg-bar-code> "::"
    <c-of-c-dept-bar-code> "::"
    <c-of-c-final-bar-code> "::"
    <c-of-c-sub-bar-code>
```

<ent-bar-code> ::== <ent-locus> <ent-process-marker> <ent-product-marker> <temp-coord-value>

<temp-coord-value> ::== "First" | "Second"
<ent-product-marker> ::== "Resource-Product" | "Activity-Product"
<ent-process-marker> ::== "In-house" | "Outsourced"

<ent-locus> ::=== <long-locus>
<int-locus> ::=== <long-locus>
<first-int-locus> ::== <long-locus>
<second-int-locus> ::== <long-locus>

<para-cust-locus> ::== <long-locus>
<cust-locus> ::== <long-locus>
<cust-wg-locus> ::== <long-locus>
<cust-dept-locus> ::== <long-locus>
<cust-final-locus> ::== <abbr-locus>
<cust-sub-locus> ::== <abbr-locus>

<c-of-c-locus> ::== <long-locus>
<c-of-c-wg-locus> ::== <long-locus>
<c-of-c-dept-locus> ::== <long-locus>
<c-of-c-final-locus> ::== <abbr-locus>
<c-of-c-sub-locus> ::== <abbr-locus>

<abbr-locus> ::== <subject-resource> <activity> <direct-object-resource>

FIG. 5-1

```
<long-locus> ::== <subject-resource> <activity> <direct-object-resource> <indirect-object-
resource>

<activity> ::=== <verb>
<verb> ::== "Div" | <phase> "." <department> "." <division>

<subject-resource> ::=== "" | <noun>
<direct-object-resource> ::=== <noun>
<indirect-object-resource> ::=== "" | <noun>

<noun> ::== <resource><resource-stage><resource-stage-value> |
    <resource-human><resource-staging-human> |
    <resource-div> |
    <resource><resource-stage-div> |
    <resource><resource-stage><resource-stage-value-div>

<phase> ::== "1"|"2"|"3"|"4"
<department> ::== "1"|"2"|"3"
<division> ::== "1"|"2"|"3"
<resource> ::== "A"|"B"|"C"|"D"
<resource-stage> ::== "1"|"2"|"3"|"4"
<resource-stage-value> ::== "i"|"ii"|"iii"

<resource-human> ::== "F"
<resource-staging-human> ::== "Work"|"Non-Work"|"Both"

<resource-div> ::== "DivDivDiv"
<resource-stage-div> ::== "DivDiv"
<resource-stage-value-div> ::== "Div"
```

FIG. 5-2

Rounded boxes represent rules.
Square boxes represent literals.

SYNTACTIC TAGGING IN A DOMAIN-SPECIFIC CONTEXT

CROSS-REFERENCE TO RELATED APPLICATIONS

This application is a continuation of application Ser. No. 14/216,390, filed Mar. 17, 2014, now U.S. Pat. No. 9,069,802, which claims the benefit of U.S. Provisional Application No. 61/801,959, filed Mar. 15, 2013, and which claims the benefit of U.S. Provisional Application No. 61/802,245, filed Mar. 15, 2013, the contents of all of which are herein incorporated by reference.

FIELD OF THE INVENTION

This application relates generally to defining a domain-specific syntax characterizing a functional information system and performing operations on data entities represented by the domain-specific syntax.

BACKGROUND

In virtually all domains, attempts at classification have been made. Many of these attempts started with a one-dimensional system based on a variant of the Dewey decimal systems. These systems were augmented with facetted keywords, creating ex-post catalogues of words that were created based on the existing system. While these efforts were normal knowledge processes created on an iterative basis that helped characterize specific domains, they were not rules-based. As a result, there are significant limitations to how data structured in this manner can be used and analyzed.

BRIEF DESCRIPTION OF THE DRAWINGS

FIG. 1 illustrates an example domain-specific syntax for a biological domain.

FIG. 2 illustrates an example domain-specific syntax for a jobs domain.

FIG. 3 illustrates an example domain-specific syntax for a machine domain.

FIG. 4 illustrates an example domain-specific syntax for an enterprise domain.

FIGS. 5-1 to 5-2 illustrate an example syntax.

DETAILED DESCRIPTION

Figure 6:
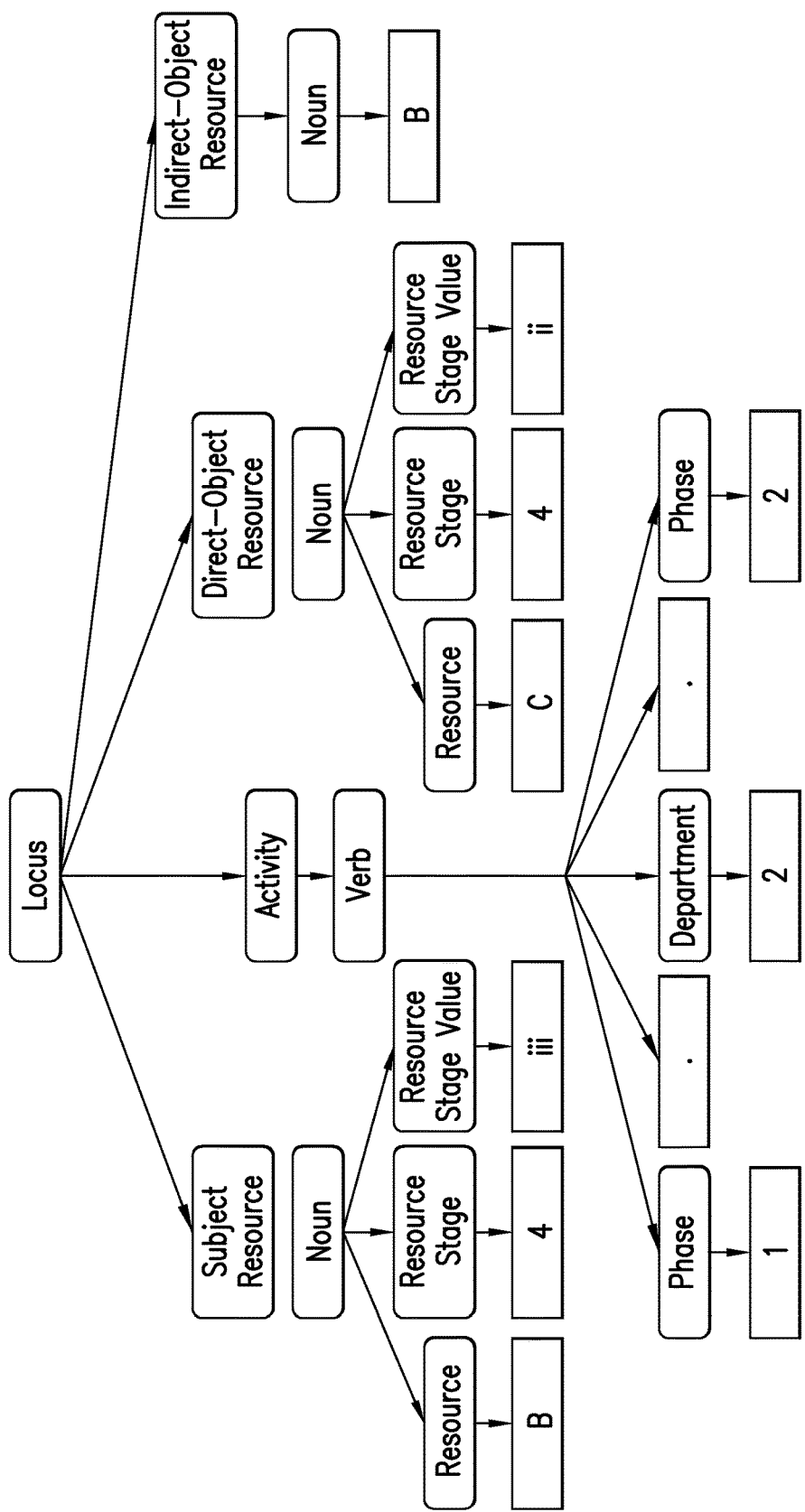
FIG. 6 illustrates an example syntax tree.

It is through establishing a set of rules for a domain that it is possible to change how information in a domain is managed. The systems and methods described herein can be configured to perform syntactic-tagging using a domain-specific syntax, developing tags based on the syntax, and applying the tags to domain-specific data entities. This disclosure describes the existence and use of domain-specific syntax and domain-specific syntactic positions, including the identification of attributes related to domain-specific data entities that are associated with syntactic positions. It further describes the relational attributes of syntactic tags that enable syntactic positions to be related to each other.

As used herein, syntax can be considered to be a set of rules. A syntactic position is a valid position based on this set of rules. A symbol in a database marks a data entity. A syntactic tag marks the association between a symbol and a rule. A syntactic tag associates the data entity marked by a symbol to the other data entities in a domain based on the syntax-established set of rules. This process of syntactic tagging provides a means for relating domain-specific information. It takes information in a domain and tags it with rules that relate it in the domain. Syntactic tags can be dynamic.

A functional information system (FIS) can be implemented using the syntactic tags described herein. The FIS can create domain-specific coordinate systems that enable data entities in a domain to be syntactically identified and related. Domain-specific syntactic tags contextualize domain specific data entities by relating them to each other within the overall context of a domain (in general) and domain syntax (specifically).

Terms and Definitions

Syntactic tags can have some or all of the following properties:

Expressions which serve as the labels for tags. Such expressions can conform to a syntax expressible in BNF notation or an equivalent meta-notation.

Any valid expression or sub-expression consisting of more than one element of the syntax, can form a locus.

Any element of the syntax that has a range of potential values describes a dimension in a discrete multidimensional space consisting of the dimensions associated with all such elements.

Any expression or sub-expression of the syntax, containing elements which have a range of potential values, may be hierarchically organized, in which case that expression or sub-expression describes a dimension which consists of regions and successive sub-regions within the multi-dimensional space. As a default, elements of syntax which are designated as hierarchical are interpreted from left to right according to their position within the expression, as successive levels from top to bottom within the hierarchy.

Syntax can represent hierarchical coordinates that provide successive specialization; the degree of specialization grows with the depth of the hierarchy. The syntax can also provide step-wise serialization at each level; the degree of serialization grows with the number of elements at each level.

In addition, at each level of specialization and/or degree of serialization, the syntax elements share a proximate syntactic position with both:

a) their parent in the hierarchy; and b) their siblings in analogous positions across different hierarchies in the same syntax in the same domain.

Syntax elements may be considered to have a proximate syntactic position if they are relatively close to other elements based on either their hierarchical specialization or serial positions. These relationships allow for comparison of values across syntactic positions. This property supports applications including but not limited to the complex structures, population sorting, autoclassification, and integration with prior art temporal and spatial classification systems.

As a default, elements of syntax which are designated as hierarchical are organized alphabetically and/or numerically within a given level of a hierarchy.

As used herein, a domain can be, but is not limited to, a field of action, thought, influence, etc., such as the domain of science. Non-limiting examples of other domains are illustrated in FIGS. 1-4.

The FIS can be implemented as a database system which utilizes syntactic tagging and the related concept of a locus, as a logical model for organizing data about a domain. A basic implementation of the FIS can be achieved by having a store of the syntactic terms of the FIS to augment the store of data entities in the domain. Each data entity would need to have a reference to its location in the FIS. These table references, would make it possible to search for all data-entities in a specific position as well as search for the position of any data entity in the system.

Syntactic Tag Use

Syntactic tags are assigned to structured or unstructured data, either manually or via an automated process and can be associated with a unique identifier for each data entity. When sets of data entities are associated with a bounded, well-known range of objects or entities, then a lexicon containing standardized identifiers may optionally be used to facilitate the assignment of identifiers to data entities.

Syntactic tags can be used to represent the syntactic components of a domain-specific data entity. They can be used for recording and storing information that indicates to a user how specific data entities relate to each other and/or to the specific domain. The tags can be used to determine which data entities are similar and/or why they are different and or to what degree they are different.

Storing domain-specific syntactic components of domain-specific data entities adds a dimensionality to data that may not otherwise exist. It is through establishing a set of rules for a domain that it is possible to change how information in a domain is managed. By establishing domain-specific rules, it is possible to characterize the syntactic components of data entities in a domain and populate sets of domain-specific syntactic tags. They can be assigned to any domain-specific data entity associated with a domain-specific syntactic position. Once assigned, stored and retrievable, the data entity can now be related with any other data entity that shares any value on its syntactic tag. It can be used for grouping of information based on, for example, broad values or very specific values. If the values are broad, it provides the ability to create ever-smaller sub-sets within the context of the broad set. If other domains share the same syntax, the tags can be used to compare data entities in one domain to data entities in other domains based on shared syntax.

The rules of syntax can be based on an arbitrary number of factors. As non-limiting examples, they could be based on common temporal order, spatial order or mechanical order. The rules could be areas specialized to a specific domain such as the order of its influences or of its origins. The rules could be experimental and the validity of the rules could be tested using syntactic tags. In each case, the knowledge influenced by some ordering principle has a syntax that provides the rules for the domain-specific ordering. The syntax provides valid positions for all domain-specific entities associated with these rules. Once recorded, stored, and retrievable, the process of relating domain-specific data entities based on syntactic tags can be based on established rules defining how different data entities relate and why. This system can be applied to any domain and any syntax. In so doing, it provides a tool to add dimensionality to information from any field. It can also provide a procedure for converting a legacy system from any field into this framework by applying syntactic tags to the legacy codes. An example syntax is illustrated in FIGS. 5-1 and 5-2.

Syntactic positions in the system have specific attributes that are associated with the rules of the syntax. For example, if a domain-specific syntax is a temporally-based syntax, the attributes will be temporally related; if it is a spatially-based syntax the attributes will be spatially related; or, if the syntax is mechanically-based, the attributes will be mechanically related. If the syntax is sequential, the attributes will be sequentially related. If the syntax is nested, the attributes will be related to the rules of nesting. Relational attributes are domain-specific. Within a domain they are specific to the underlying rules of the domain-specific syntax. An example syntax tree for economic systems is illustrated in FIG. 6.

To create syntactic tags, first a domain is defined, then a domain-specific syntax is defined. Once these steps are performed, syntactic tags can be created. In a preferred embodiment, the system can be configured so that the specific rules of the domain-specific syntax are fully represented in these domain-specific syntactic tags.

Syntactic tagging links data entities with shared attributes by assigning each data entity to an element in the set of common syntactic tags. The syntactic tags associate data entities with the other data entities in a domain according to their syntactic associations. Thus, they inherently group and/or cluster all data entities that share syntactic tags.

Syntactic Tagging Operations

In some embodiments, syntactic tags can be assigned to data entities which have one or more attributes in common, or the same or similar meaning, in a context of interest for the domain to which the FIS is applied. By tagging data entities with data-entity-type tags, the system can operate on multiple different kinds of data within a domain or data set. For example, data for products or markets can be added to company data. This function can be used in connection with flagging functions, described below, to indicate that certain tags may be required only for specific data-types.

Hierarchically organized tags can be used to express:

(1) successive specialization, whereby all data entities that share the same tag at a higher level also share certain common characteristics or meanings within the domain; and the ordering of such labels within a level is a matter of tag assignment convention, or is arbitrary and/or (2) a sequential process whereby all data entities that share the same tag at the next higher level also share the common characteristic that they are successive steps the same sequential process of the domain, at the same level of process-detail; and the ordering of such labels within the category directly reflects the sequence of steps.

Domain Model Completeness for Structures of Interest

The complete enumeration of the valid syntactic tags, as determined by the syntax, in as-intended use, provides a complete pre-existing model for the structures of interest in the domain to which the FIS model is applied, regardless of whether any data is actually tagged with any given label.

Multiple Syntaxes

Syntactic tags do not need to derive from a single syntax. The FIS can be implemented using multiple syntaxes for tagging of the same data within a given domain. Syntaxes which apply to more than one domain can be used as the basis for a functional equivalence across those domains.

Simple Multiple Syntaxes

A simple multiple syntax can be used to enhance the value of applying multiple syntaxes to an FIS model of a domain. For example, if an executive recruiting FIS model/domain is established which encompasses not only the company data set associated with economics/business domain, but also additional data, executive recruiting data can be used within the economics/business domain to enhance investment portfolios with executive team performance metrics, based on historical performance analysis associated with members of the executive team when they were at previous companies. As a result, the system can be used to avoid correlation and ensure diversification as well as screen for companies likely to outperform based on executive team.

Complex Multiple Syntaxes

A complex multiple syntax can be used to enhance the value of applying multiple syntaxes across an FIS model of a domain. Similar to the manner in which multiple syntaxes can be applied to a single data set, those multiple syntaxes can be applied across distinct data sets (each of which may have one or more syntaxes associated with it). As a result, syntaxes and data sets can have one-to-many, many-to-one, and/or many-to-many relationships, as described below.

One-to-Many: One syntax (e.g., executive recruiting) applied to a company data set and an individual-executive data set.

Many-to-One: Similar to simple multiple syntaxes, for example, executive recruiting and economics/business syntaxes could be applied to the company data set.

Many-to-Many: With many-to-many, substantially complex queries and relationships can be explored.

Multiple syntaxes can be used in a variety of different ways for a variety of different applications to order information in a way that it makes data more accessible, searchable and comparative within a domain and across domains.

Syntax Flags

Some embodiments of the system can include syntax flag functionality. A syntax flag is a string of syntactic tags or loci that represent a valid syntactic position. Syntax flags can be used in connection with macro-tags comprising micro-tags, such as in a bar code. In various embodiments, flags can be associated with an entire syntax and/or components of a syntax.

The process of discovery or validation of functional equivalences can be based on a range of valid expressions, including those which are flagged within the syntax. In some examples, a single flag may be applied; in other examples, a flag could be a member of one of several classes of flags. A class of flags can be configured to express the flags which are applied to the primary syntax, in turn by using a syntax (or meta-notation) to describe the flags.

In some examples, syntactic tags can be assigned to data entities which have one or more attributes in common, or the same or similar meaning, in a context of interest for the domain to which the FIS is applied.

The system can be configured to enforce required tags that are so designated, e.g. every enterprise must have an <enterprise locus resource> tag and it may also have a <customer locus resource> tag, and <customer of customer locus resource> tag. For example, the system can be configured to require (in the case of the economics/business domain) companies to have all appropriate tags and the BNF illustrated in the figures could be extended as follows:

```
<enterprise locus resource> ::=<locus>
<customer locus resource>::=<locus>
<customer of customer locus resource> ::=<locus>
<locus> ::= <subject-resource> <activity> <direct-object-resource>
<indirect- object-resource>
```

In this example, if <enterprise locus resource> does not get tagged with a subject resource because it is implicit or unnecessary, then the definition can be revised as follows:
<enterprise locus resource>::=<activity><direct-object-resource><indirect-object-resource>

The system can be configured for an overtly literal designation of the type of locus resource by defining these as having a predetermined literal reflecting the type of locus as follows:

```
<enterprise locus resource> ::="Enterprise Locus Resource ="<locus>
<customer locus resource>::="Customer Locus Resource ="<locus>
```

Autoclassification

Autoclassification can be used for applying syntactic tags to data entities in an existing structured or unstructured domain-specific database through text mining by matching sets of text-mined values associated with a specific data entity to a specific syntactic position (simple or complex) and tagging the text-mined values with syntactic tags that are associated with the specific syntactic position.

Autoclassification solves the problem of having to manually associate large data sets to classification systems. This is the traditional way of classifying data entities in a domain. Traditional classification systems build a domain of related flat taxonomies and then manually tag the information as it is entered in the database, such as a library tags books using the Dewey decimal system or governments classify businesses using SIC or NAICS codes.

Enabled by domain completeness, domain-specificity and domain syntax, autoclassification syntactically tags domain-specific data entities on an automated basis. This function is performed by using domain-specific text mining algorithms that can match words or symbols that are associated with domain-specific data entities to domain-specific syntactic positions (simple or complex) and then tagging the domain-specific data entity with the syntactic tag or tags associated with the syntactic position on an automated basis.

Autoclassification can be used to tag whole domains containing domain-specific data entities with syntactic tags based on a domain-specific syntax. This method can include converting a structured or unstructured domain to a set of standardized syntactic tags that relates data entities in a common domain according to a domain-specific syntax.

Autoclassification can be used to convert legacy classification systems to syntactic tags. This method can include converting a domain that has many sub-domains that utilize non-conforming classification, that are not compatible, to a set of standardized syntactic tags that unifies different systems in a common domain. In some examples, this can include converting businesses, products and labor (all with different systems) into a unifying syntax.

The autoclassification framework can include a domain-specific dictionary in which the terms represent complex syntactic structures with names. The dictionary can be used to tag data entities with complex syntactic structures by matching the dictionary terms with text mining algorithms.

Mapping from one classification system to another is common in legacy systems. For example, when one company acquires another, the two companies may have different information and accounting systems. Moving from one system to another system requires mapping data entities from one system to the other system. Once done, the legacy system that has been transferred is abandoned; information is then collected according to the new system. In many cases, however, this is not possible. For example, governments collect data over long periods of time. Consistency of data is critical in the usefulness of this data.

A data conversion may require applying the conversion to every historical period and/or maintaining two sets of records (an old and a new). A problem may arise in that newer systems may reflect the current vocabulary of the time and place. There is typically is no convenient way to go back and recode the historical. Syntactic tags solve this problem because they use syntactic categories that are unchanged over time. There have been syntactically-definable business entities for much of human history, although the words used to describe them or classify them may have changed.

Syntactic tags can provide a system to reclassify these historical terms in a historically consistent method. This can be performed by the system using a process that collects information about a data entity and, based on that information, selects a term from a predefined dictionary of terms. The terms in this dictionary can have, as attachments, domain-specific tags that classify them in the specific domain and may, in addition, contain contextual identifiers that further identify them within a domain. The algorithm can then attach a dictionary term with its pre-defined tags to the specific data entity. The algorithm enables the system to a tag data entity with multiple identifiers by matching it with a value in the domain-specific dictionary.

Visualizations

The syntax and syntactic tags can be used to enable a visualization engine based on domain-specific syntactic tagging. More specifically, the syntax can be used to describe dimensions of a coordinate space and thereby enable coordinate space graphic plots. The result can be a syntactically-driven visualization and discovery mechanism. Any element of the syntax that has a range of potential terminal values that describe a dimension in a discrete multidimensional space can drive these visuals and enable sets of pre-set inter-level or intra-level visualization packages for any domain.

The syntactic visualization tools of the system can use pre-set visualization templates utilizing coordinates of the domain-specific syntax. The system can be configured to filter the values associated with domain-specific entities to specific syntactic positions on these visualization templates to create a domain-specific template for a specific set of domain-specific data entities. For example, one axis can be syntactic coordinates for jobs and the other axis can be syntactic coordinates for companies and the chosen query might be "Seattle." The visualization tool would map Seattle jobs into this map according to the specific domain syntax. This same query could then be performed on any other geographic area using the same coordinates. In this way, domain-specific data could be organized according to a domain-specific syntax in standardized form. This form could also be used to compare the same values at multiple different geographic locations and multiple different times.

Syntactic visualization tools can also be powered by a visualization engine that enables the user to custom-select multiple syntactical coordinate ranges and query the system to present a visualization that integrates the multiple coordinates and presents them in a multi-dimensional visualization using a chosen set of domain-specific data entities. Once chosen, this visualization could be used for any set of domain related data entities. The visualizations generated by the system can be used for granular domain-specific analysis and dynamic comparison across the domain at any point in time at any geographic or spatial orientation.

Ordering of Domain-Specific Populations Using Syntactic Tags

The system can be configured to create custom domain-specific hierarchies on domain-specific data entities. Domains consist of heterogeneous populations of domain-specific data entities. The goal of classification systems, in large part, is to organize these data entities into common categories. Syntactic tagging adds dimensionality not available in existing classification systems by relating each data entity to other data entities within a coherent whole. In doing so, it provides dimensionality and customization in the ordering of domain entities. It enables a user to create broad categories of the data entities chosen by the user. It does this by providing an interface for a user to create any desired parent grouping by identifying a narrow set of attributes. It then enables the user to create sub-populations that are characterized by more attributes in addition to the parent attributes. This process can continue until the data entities sorted by the parent query have been exhausted.

The system can be configured to build custom population groupings of domain-specific entities based on syntactic tagging and thereby create custom population control algorithms and structures. In many fields, such as the sciences, there is a science behind population groupings because they are the underpinning of most domain-specific experiments or controls. For example, these type of population groupings enable the tolerances in continuous processes to be optimized, they enable risk to be minimized by allocating data entities across differentiated population groupings such as in clinical trials or risk management in finance, and they can control for variances in customer demand in market demand studies. Domain-specific syntactic tags can be used in the system as a dynamic tool to build custom groupings and test these groupings scientifically against real world examples. They can be used in the system to provide a customization in population control, enable experimentation in the testing of domain-specific relationships relative to domain-specific outcomes and, in turn, they provide the ability to control and predict outcomes.

Integration of FIS with Time and Space

Some domains may depend on temporal or geographic factors. If a domain is independent of these factors, its domain-specific syntax may also be independent. Combining FIS syntactic tags with temporal and geographic data can provide another tool for organizing domain-specific data entities in domains that do depend on temporal or geographic factors. So for every valid syntactic tag there can be a corresponding geographic tag and temporal tag.

Time and space can also be grouped or divided into defined chunks that can be used as specific temporal and spatial (or geographic) tags and attached to domain-specific data entities to complement the syntactic tags. For example, terms such as "long haul" or "short haul" can be defined by such chunking, as can time periods such as "before electricity," "the period while electricity was being developed," and "after electricity was developed." The use of temporal and geographic chunking provides a dynamic not found in traditional classification system that needs to be updated as the domain evolves and changes.

FIS tags can have integrated temporal and geographic values and each query can be an integrated search of: FIS value, temporal value, and/or geographic value. This integration of time, space, and FIS on a domain-specific basis enables powerful types of domain-specific search, retrieval, and analysis.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Ruby™, Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any operating system or environment executing in a virtualized or non-virtualized environment, using any programming language suitable for software development, including, but not limited to, different versions of Microsoft Windows™, Android™, Apple™ Mac™, iOS™, Unix™/X-Windows™, Linux™, etc. The system could be implemented using a web application framework, such as Ruby on Rails.

The processing system can be in communication with a computerized data storage system. The data storage system can include a non-relational or relational data store, such as a MySQL™ or other relational database. Other physical and logical database types could be used. The data store may be a database server, such as PostgreSQL™, MongoDB™, Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. The figures herein represent example use cases for the syntactic tagging system and are not intended to be limiting on the scope of the invention. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

The invention claimed is:

1. A method for computationally determining navigational associations within an n-dimensional database, the method comprising:
    electronically storing a set of data entities in a database system, wherein the data entities represent elements of a biological system;
    wherein one or more elements of the biological system comprise an organ system, a tissue, a cell, a genetic sequence, or a component thereof serving a common function;
    electronically storing a computerized representation of a biological system syntax, wherein the biological system syntax can be an input to an algorithm executed on a computer processor to validate or generate a finite combination of the data entities;
    electronically assigning syntactic tags to the data entities in a logical data model based on biological attributes of the elements of the biological system represented by the data entities;
    wherein the logical data model comprises at least two fields ordered by a set of interrelationships among at least two elements of the biological system, the interrelationships corresponding to functional properties in a biological domain, and wherein the biological attributes comprise type, position, or expression of one or more elements of the biological system;
    wherein one or more of the data entities represent one or more nodes or a property of a set of nodes, wherein a node represents a syntactic tag that has a range of values represented as coordinates in n-dimensional space with successive specialization of the functional properties as represented in the logical data model, wherein specialization is represented by a position of a tag in the syntactic structure;
    wherein a set of connections among the nodes represents a set of the interrelationships corresponding to functional properties in the biological domain;
    wherein the syntax describes a dimension in the n-dimensional space associated with a set of the elements of the biological system, wherein the finite combination of data entities describes a dimension which consists of regions and subregions within the n-dimensional space;
    algorithmically identifying a set of syntactic positions in the n-dimensional space;
    organizing and electronically storing the set of syntactic positions for use with a navigation function which identifies a set of associations among the nodes based on their locations in n-dimensional space, wherein the set of associations represent a plurality of the interrelationships corresponding to functional properties in the biological domain;
    receiving an input query from a user, wherein the query corresponds to an attribute of the biological system; and
    electronically traversing the n-dimensional space to retrieve a result regarding an element of the biological system.

2. The method of claim 1, further comprising:
    executing the navigation function;
    using a resultant set of associations among nodes as inputs to a comparison function which orders the set of associations; and
    executing and storing the results of the comparison function to perform a set of modifications to the biological system.

3. The method of claim 1, wherein the finite combination of elements comprises two reference points and a connection between the reference points further comprising:
    ordering the two or more reference points by the functional similarity of the reference points with respect to a third reference point, and
    wherein the functional similarity of the reference points is ordered based on the relative locations of the reference points in n-dimensional space.

4. The method of claim 3, wherein functionally similar reference points in n-dimensional space have more common functional attributes than a plurality of an arbitrarily large set of random pairs of reference points.

5. The method of claim 1, further comprising:
    constructing a visual representation of the n-dimensional space;
    displaying one or more reference points based on functional attributes, tags, or interactions in the functional system; and
    displaying the visual representation of the n-dimensional space comprising the result.

6. The method of claim 1, further comprising:
    selecting one or more dimensions from the n-dimensional space to create a subset of the space; and
    electronically calculating a similarity metric on the subset.

7. The method claim 1, further comprising:
    adding one or more dimensions to the n-dimensional space to create a superset of the space; and
    electronically calculating a similarity metric on the superset.

8. The method of claim 1, wherein a top-level domain represents the biological system, and a plurality of subdomains represent a plurality of the elements of the biological system.

9. The method of claim 1, wherein the data entities represent semantic units corresponding to elements of the biological system, further comprising:
    electronically assigning tags representing syntactic categories to a plurality of semantic units;
    selecting a first syntactic category;
    electronically assigning tags representing syntactic category stages to a plurality of semantic units in the first syntactic category;
    selecting a second syntactic category;
    electronically assigning tags representing syntactic category stages to a plurality of semantic units in the second syntactic category,
    wherein the syntactic categories and category stages comprise a stratified syntactic architecture; and
    wherein the database electronically represents the stratified syntactic architecture, thereby enabling a computer processor to group the units based on their syntactic relationships.

10. The method of claim 1, further comprising normalizing the distribution of a value associated with the elements of the biological system, as determined by a computational test.

11. The method of claim 1, further comprising:
electronically storing a computerized representation of an economic system syntax, wherein the economic system syntax is provided as an input to a computer processor to algorithmically validate or generate finite combination of heterogeneous economic elements or their interrelationships;
identifying and tagging a plurality of interactions across the economic and biological systems; and
executing a comparison function with respect to a modified economic system.

12. A system for computationally determining navigational associations within an n-dimensional database, the system comprising:
a data storage device configured for:
electronically storing a set of data entities in a database system, wherein the data entities represent elements of a biological system;
wherein one or more elements of the biological system comprise an organ system, a tissue, a cell, a genetic sequence, or a component thereof serving a common function;
electronically storing a computerized representation of a biological system syntax, wherein the biological system syntax can be an input to an algorithm executed on a computer processor to validate or generate a finite combination of the data entities;
a computerized processor device configured for:
electronically assigning syntactic tags to the data entities in a logical data model based on biological attributes of the elements of the biological system represented by the data entities;
wherein the logical data model comprises at least two fields ordered by a set of interrelationships among at least two elements of the biological system, the interrelationships corresponding to functional properties in a biological domain, and wherein the biological attributes comprise type, position, or expression of one or more elements of the biological system;
wherein one or more of the data entities represent one or more nodes or a property of a set of nodes, wherein a node represents a syntactic tag that has a range of values represented as coordinates in n-dimensional space with successive specialization of the functional properties as represented in the logical data model, wherein specialization is represented by a position of a tag in the syntactic structure;
wherein a set of connections among the nodes represents a set of the interrelationships corresponding to functional properties in the biological domain;
wherein the syntax describes a dimension in the n-dimensional space associated with a set of the elements of the biological system, wherein the finite combination of data entities describes a dimension which consists of regions and subregions within the n-dimensional space;
algorithmically identifying a set of syntactic positions in the n-dimensional space;
organizing and electronically storing the set of syntactic positions for use with a navigation function which identifies a set of associations among the nodes based on their locations in n-dimensional space, wherein the set of associations represent a plurality of the interrelationships corresponding to functional properties in the biological domain;
receiving an input query from a user, wherein the query corresponds to an attribute of the biological system; and
electronically traversing the n-dimensional space to retrieve a result regarding an element of the biological system.

13. The system of claim 12, further comprising:
executing the navigation function;
using a resultant set of associations among nodes as inputs to a comparison function which orders the set of associations; and
executing and storing the results of the comparison function to perform a set of modifications to the biological system.

14. The system of claim 12, wherein the finite combination of elements comprises two reference points and a connection between the reference points further comprising:
ordering the two or more reference points by the functional similarity of the reference points with respect to a third reference point,
wherein the functional similarity of the reference points is ordered based on the relative locations of the reference points in n-dimensional space.

15. The system of claim 14, wherein functionally similar reference points in n-dimensional space have more common functional attributes than a plurality of an arbitrarily large set of random pairs of reference points.

16. The system of claim 12, further comprising:
constructing a visual representation of the n-dimensional space;
displaying one or more reference points based on functional attributes, tags, or interactions in the functional system; and
displaying the visual representation of the n-dimensional space comprising the result.

17. The system of claim 12, further comprising:
selecting one or more dimensions from the n-dimensional space to create a subset of the space; and
electronically calculating a similarity metric on the subset.

18. The system of claim 12, further comprising:
adding one or more dimensions to the n-dimensional space to create a superset of the space; and
electronically calculating a similarity metric on the superset.

19. The system of claim 12, wherein a top-level domain represents the biological system, and a plurality of subdomains represent a plurality of the elements of the biological system.

20. The system of claim 12, wherein the data entities represent semantic units corresponding to elements of the biological system, further comprising:
electronically assigning tags representing syntactic categories to a plurality of semantic units;
selecting a first syntactic category;
electronically assigning tags representing syntactic category stages to a plurality of semantic units in the first syntactic category;
selecting a second syntactic category;
electronically assigning tags representing syntactic category stages to a plurality of semantic units in the second syntactic category, and
wherein the syntactic categories and category stages comprise a stratified syntactic architecture, and wherein the database electronically represents the stratified syntactic architecture, thereby enabling a computer processor to group the units based on their syntactic relationships.

21. The system of claim 12, further comprising normalizing the distribution of a value associated with the elements of the biological system, as determined by a computational test.

22. The system of claim 12, further comprising:
electronically storing a computerized representation of an economic system syntax, wherein the economic system syntax is provided as an input to a computer processor to algorithmically validate or generate a finite combination of heterogeneous economic elements or their interrelationships;
identifying and tagging a plurality of interactions across the economic and biological systems; and
executing a comparison function with respect to a modified economic system.

* * * * *